United States Patent
Parker

(10) Patent No.: US 6,350,040 B1
(45) Date of Patent: Feb. 26, 2002

(54) FLASHLIGHT CHARGER AND RECHARGEABLE BATTERY

(75) Inventor: David H. Parker, Torrance, CA (US)

(73) Assignee: Pelican Products, Inc., Torrance, CA (US)

( * ) Notice: Subject to any disclaimer, the term of this patent is extended or adjusted under 35 U.S.C. 154(b) by 0 days.

(21) Appl. No.: 09/565,934

(22) Filed: May 5, 2000

(51) Int. Cl.[7] .................................................. F21L 4/08
(52) U.S. Cl. ...................................... 362/183; 320/113
(58) Field of Search ......................... 362/183; 320/107, 320/110, 111, 112, 113, 114, 115

(56) References Cited

U.S. PATENT DOCUMENTS

| | | | | |
|---|---|---|---|---|
| 4,288,733 A | * | 9/1981 | Bilanceri | 252/301.4 P |
| 5,059,885 A | * | 10/1991 | Weiss | 320/115 |
| 5,410,237 A | | 4/1995 | Sharrah et al. | 320/115 |
| 5,412,665 A | | 5/1995 | Gruodis et al. | |
| 5,416,434 A | | 5/1995 | Kootstra et al. | |
| 5,525,888 A | * | 6/1996 | Toya | 320/111 |
| 5,689,171 A | * | 11/1997 | Ludewig | 320/110 |
| 5,908,233 A | * | 6/1999 | Heskett | 320/183 |
| 6,124,699 A | * | 9/2000 | Suzuki | 320/110 |
| 6,127,802 A | * | 10/2000 | Lloyd | 320/113 |

* cited by examiner

Primary Examiner—Alan Cariaso
Assistant Examiner—Hargobind S. Sawhney
(74) Attorney, Agent, or Firm—Oppenheimer, Wolff & Donnelly

(57) ABSTRACT

A recharger device for the battery includes a device with a first slot for a first device, such as a flashlight for recharging. A second slot in relationship to the first slot is provided for receiving a second device for recharging. Locking means with each slot such is moveable to permit release one or other device after moving the locking member between a closed position to an open position. The flashlight includes a battery pack to act as a closure of an opening to a battery housing. The closure is in the tailpiece and is mounted in the battery housing. The closure is connected integral with a rechargeable battery such that when the batteries are located in position in the battery housing the battery housing is closed.

19 Claims, 9 Drawing Sheets

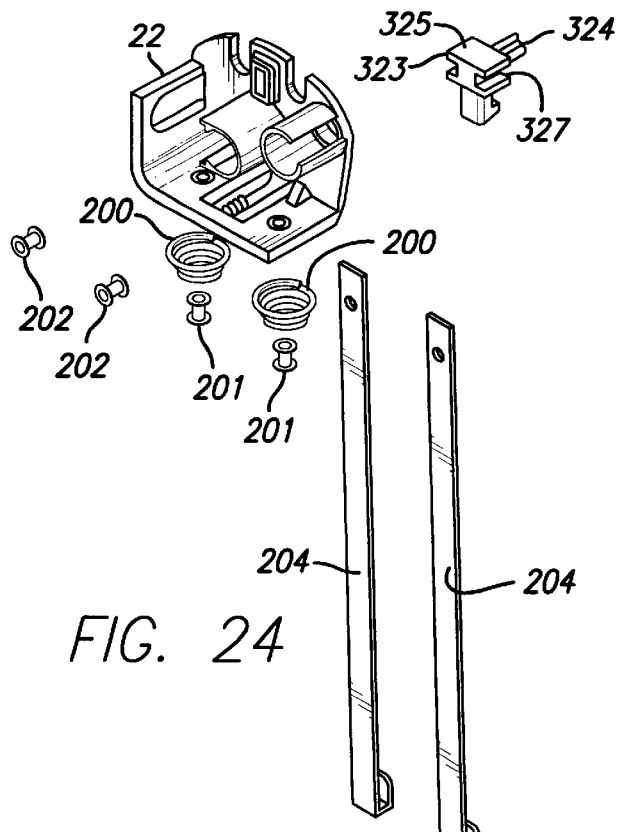
FIG. 24
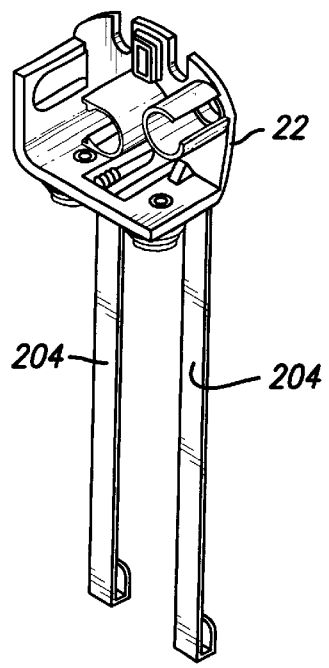
FIG. 25
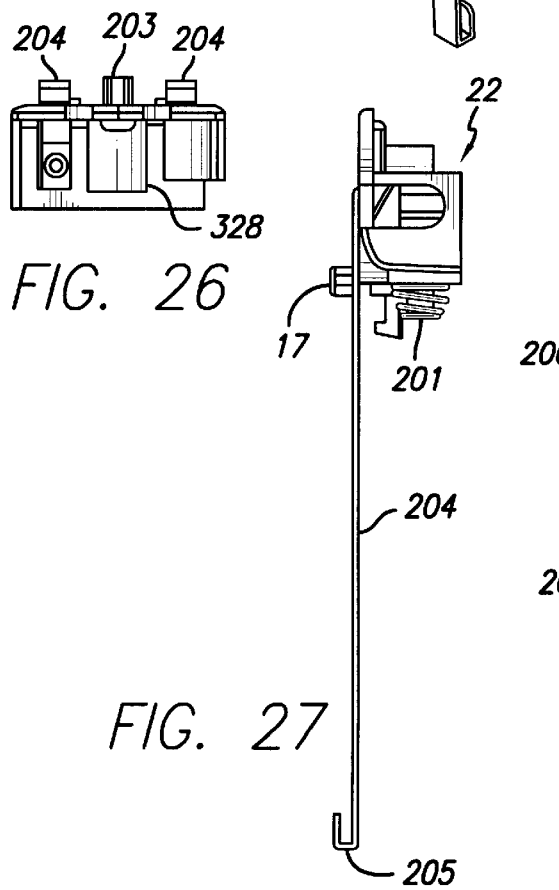
FIG. 26
FIG. 27
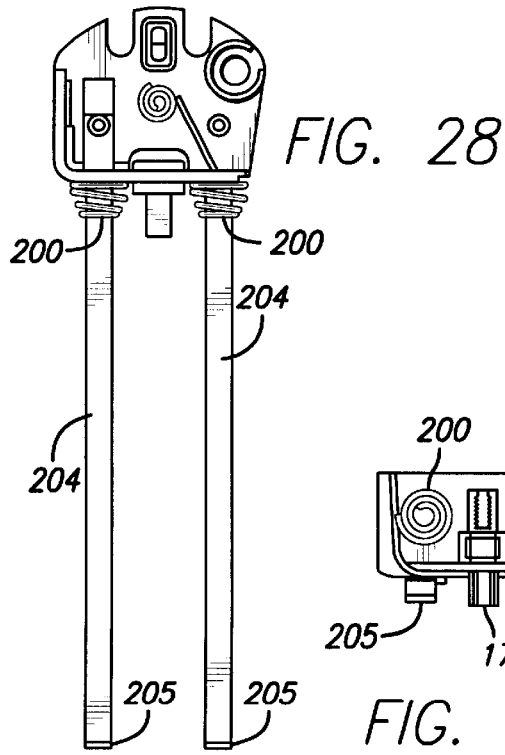
FIG. 28
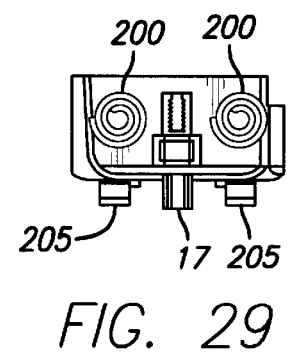
FIG. 29

US 6,350,040 B1

FLASHLIGHT CHARGER AND RECHARGEABLE BATTERY

BACKGROUND OF THE INVENTION

This invention relates to a flashlight, a charger and a rechargeable battery pack.

Many flashlights, chargers and rechargeable battery packs are known. Different configurations and arrangements of these devices exist.

Some of these devices, for instance, chargers, have different requirements for different uses, for example, recharging other devices. For instance in the safety area, for example, in fire fighting, flashlights need to be particularly rugged in their construction and also be capable of remaining charged for long periods of time. They need to be available for emergency use and to be operable for long periods of time under tough conditions. Chargers also should be capable of a novel function acting in a positive manner with the devices for recharging, and rechargeable battery packs used to be streamlined to operate effectively with the device using the batteries and with the recharger.

This invention is directed to providing a flashlight, a charging system and a rechargeable battery pack which overcomes disadvantages of existing devices and systems and provides novel characteristics.

SUMMARY OF THE INVENTION

According to the invention a recharger device for the battery includes a device with a first slot for a first device, such as a flashlight for recharging. A second slot in relationship to the first slot is provided for receiving a second device for recharging. There are electrical means for connecting the contacts to a recharging current to flow through the contacts to the two devices being recharged.

Preferably there are locking means associated with each slot such that the locking member is moveable to permit release one or other device after moving the locking member between a closed position to an open position.

The flashlight, for use preferably with the recharging means described, includes a battery pack to act as a closure of an opening to a battery housing. The closure is in the tailpiece of the flashlight and is mounted in the battery housing for the flashlight. The closure is connected integrally with a rechargeable battery pack. As when the batteries are located in position in the battery housing when the battery housing is closed.

There is also an aperture in the battery housing. The aperture is for receiving a button element connected with the battery pack or an extension to the battery pack. The button element is spring loaded such that when the battery pack is correctly located in the battery housing, the button element fits in the aperture and locks the battery pack in position in the battery housing.

The rechargeable battery pack including batteries in relative side-by-side relationship. An extension from the battery permits the batteries to be connected in the battery housing in an operative manner. There are contact means for the batteries of the battery pack which permits the recharging of the batteries by a recharger.

The button element is preferably mounted on the extension. This permits the release of the battery pack from the battery housing. Also on the extension there are electrical contacts and circuits for connecting a flash bulb of the flashlight electrically to the battery pack.

The invention is now described with reference to the accompanying drawings which are only illustrative of the invention.

BRIEF DESCRIPTION OF THE DRAWINGS

FIG. 24 is an exploded view of components for attachment to the rechargeable battery pack.

FIG. 25 is an assembled view of components for attachment to the rechargeable battery pack.

FIG. 26 is a top view of the extension components for attachment to the rechargeable battery pack.

FIG. 27 is a side view of the extension components for attachment to the rechargeable battery pack.

FIG. 28 is a front view of the extension member for attachment to the rechargeable battery pack.

FIG. 29 is a bottom view of the extension member.

DETAILED DESCRIPTION OF THE PREFERRED EMBODIMENT

Figure 1:
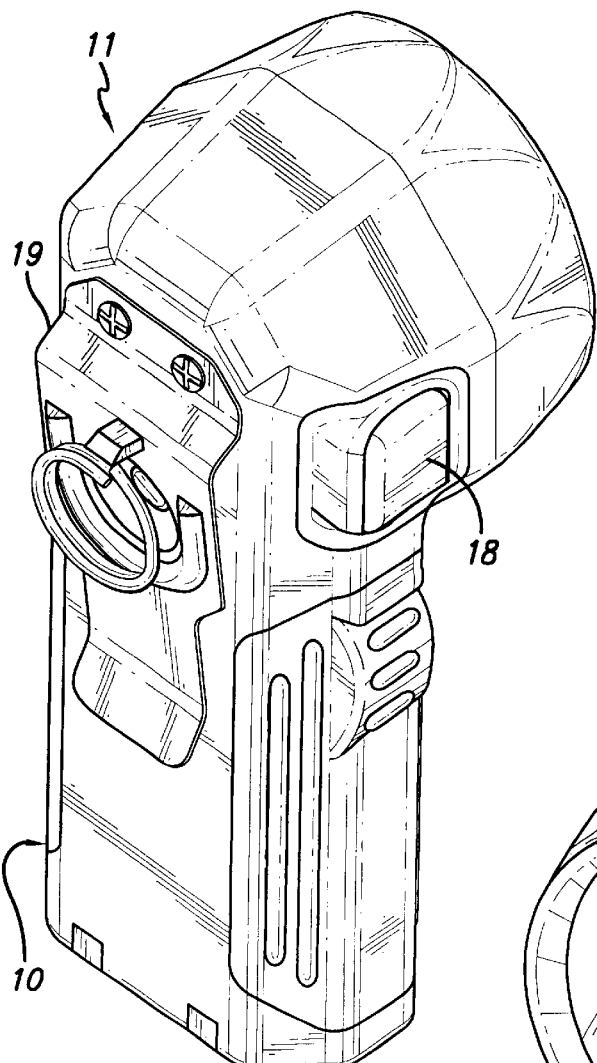
FIG. 1 is a rear perspective view of a flashlight in accordance with the invention.
Figure 2:
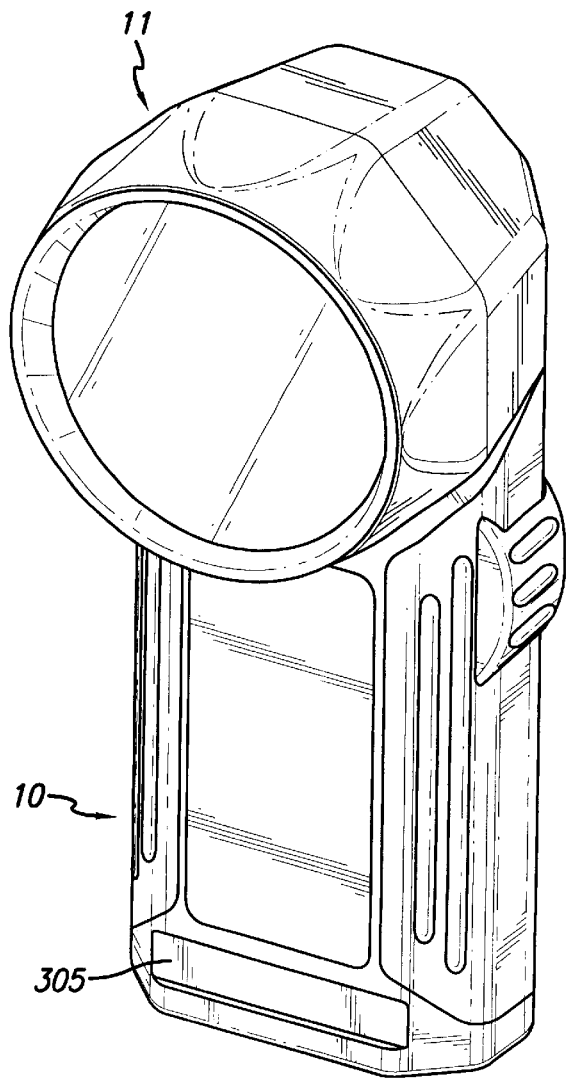
FIG. 2 is a front perspective view of a flashlight in accordance with the invention.

In FIG. 1 there is shown a right angular flashlight. There is a battery casing 10 connected with a right angular housing 11 in which is mounted a lens assembly. This right angular flashlight is further illustrated in several of the other figures. There is a lens 12 and a lens shroud 13. Behind the lens shroud 12, as shown in FIG. 3, there is a lamp or bulb 14 which is mounted with a reflector 15.

Figure 3:
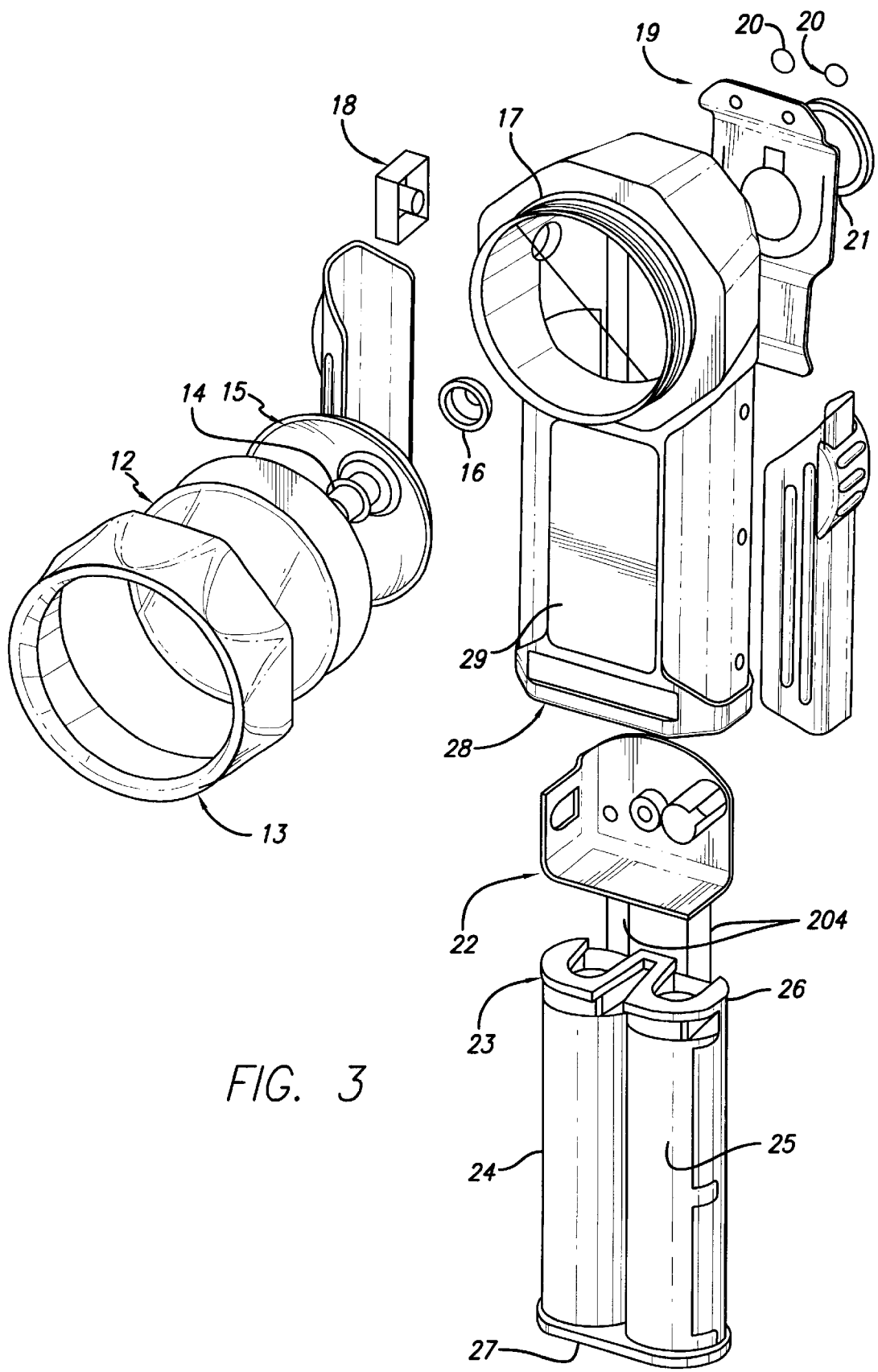
FIG. 3 is a different frontal perspective view of a flashlight in accordance with the invention.
Figure 4:
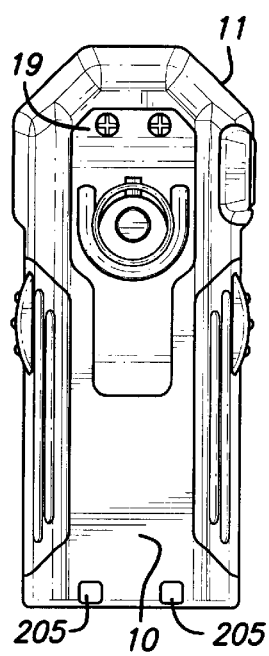
FIG. 4 is a rear view of the flashlight in accordance with the invention.
Figure 5:
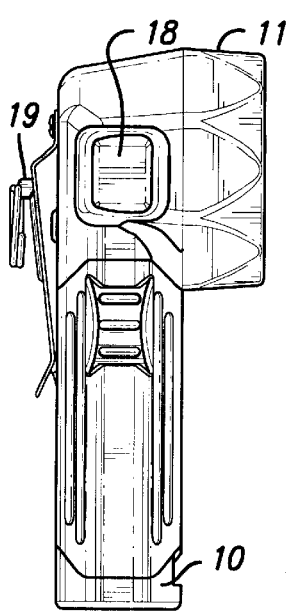
FIG. 5 is side view of a flashlight in accordance with the invention.
Figure 6:
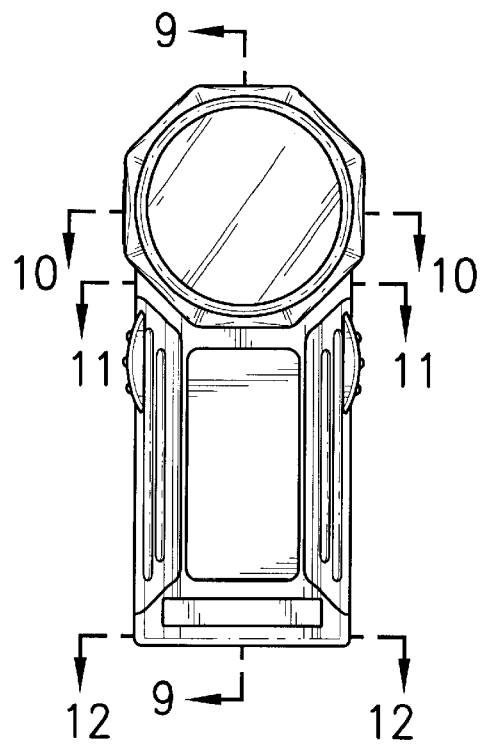
FIG. 6 is a front view of the flashlight in accordance with the invention.
Figure 7:
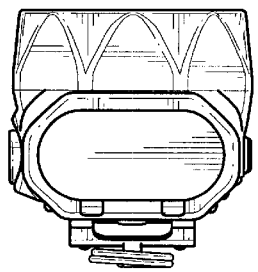
FIG. 7 is a bottom view of a flashlight in accordance with the invention.
Figure 8:
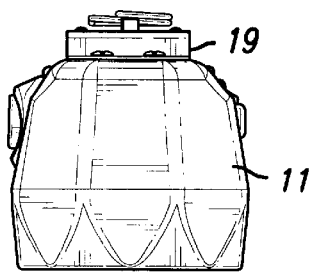
FIG. 8 is a top view of a flashlight in accordance with the invention.
Figure 9:
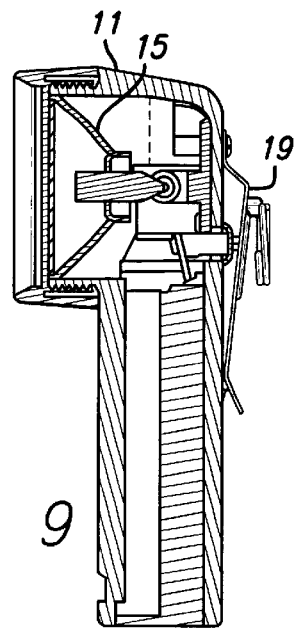
FIG. 9 is a side perspective view along line B—B of the flashlight in accordance with the invention.
Figure 10:
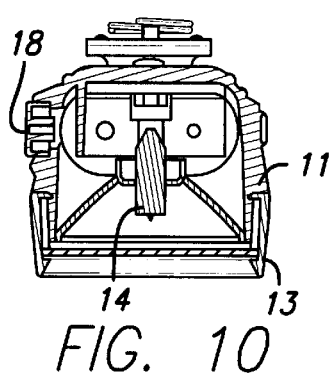
FIG. 10 is a sectional view along line F—F of a flashlight in accordance with the invention.
Figure 11:
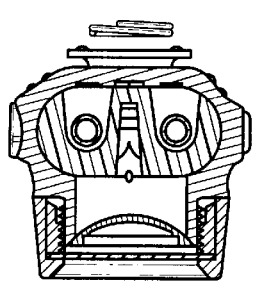
FIG. 11 is a sectional view along line D—D of a flashlight in accordance with the invention.
Figure 12:
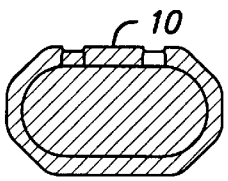
FIG. 12 is a sectional view along line E—E of a flashlight in accordance with the invention.

In the exploded view of FIG. 3 there is also shown a boot actuator 16 which fits in the aperture 17 in the rear face of the battery casing 10. On the side wall of the casing 10 there is a switch boot 18. The switch boot 18 is for switching the flashlight on and off in a conventional operative manner. The switch boot is pushed in under finger pressure and forced out under spring pressure relative to an aperture in the side of the casing 10. On the rear wall of the battery casing 10 there is a clip 19 which is mounted with two screw keepers on latches 20 to secure the clip 19 to the rear of the casing 10.

The clip 19 facilitates use by a user such as clipping the flashlight onto clothing. There is a split ring 21 which is affixed to the configuration so that the rear of the flashlight can be effectively suspended from a support as required.

There is also a bracket extension assembly 22 which operates together with a rechargeable battery pack 23. The battery pack 23 includes a pair of batteries 24 and 25 in side-by-side relationship mounted in a casing or holder 26. The base 27 of the holder 26 forms part of the base of the battery casing 10. For suitable configurations contacts extends through the base 27 to permit for recharging of the batteries 24 and 25 of the rechargeable battery pack 23 as described below. As such, the base 27 would be located adjacent to the foot or tail cap 28 of the battery casing 10. The front of the battery casing 10 is fitted with a label element which can be metallic or a plastic transfer suitably put in position. The battery casing 10 also has two rubberized grips around the harder steel for the casing 10. The grips are adhere to the casing.

Figure 13:
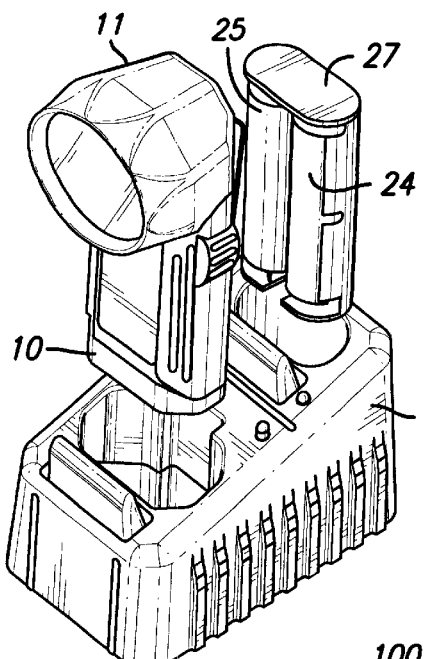
FIG. 13 is a perspective view of a recharger with a first recharging device being a flashlight and a second recharging device being a battery pack.
Figure 14:
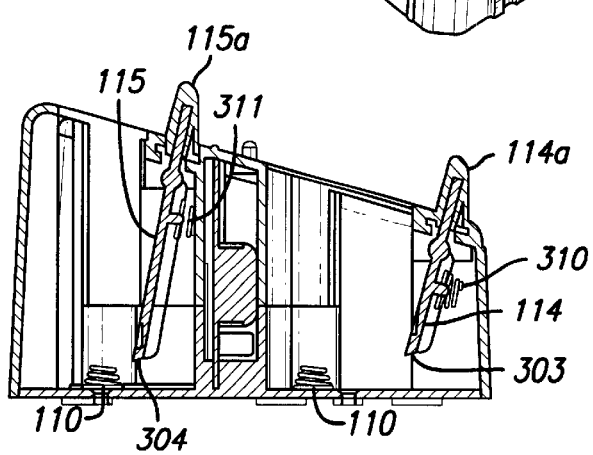
FIG. 14 is a sectional view of a recharging device.
Figure 15:
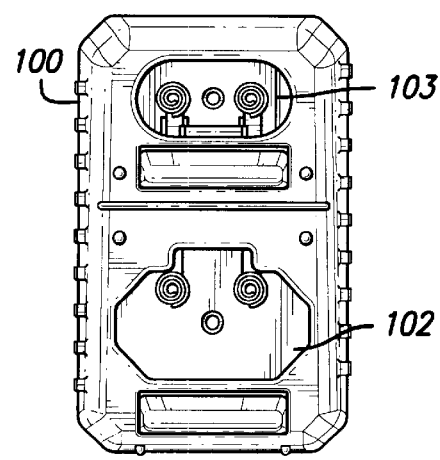
FIG. 15 is a side view of a recharging device.
Figure 16:
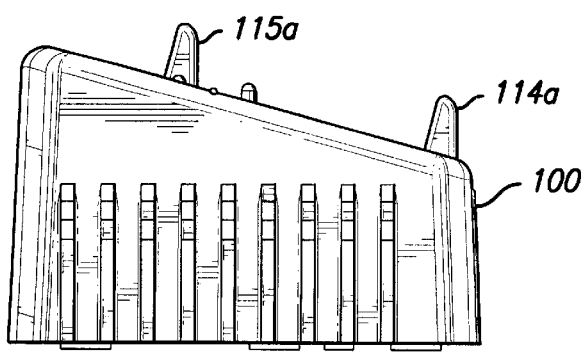
FIG. 16 is an underview of the recharging device.
Figure 17:
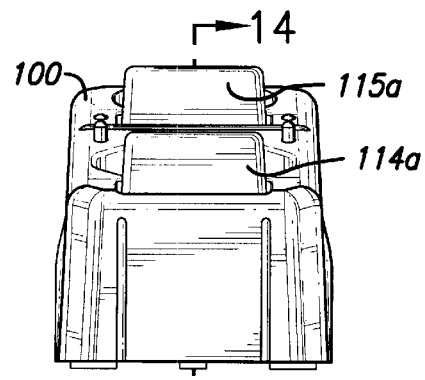
FIG. 17 is a front view of a recharging device.
Figure 18:
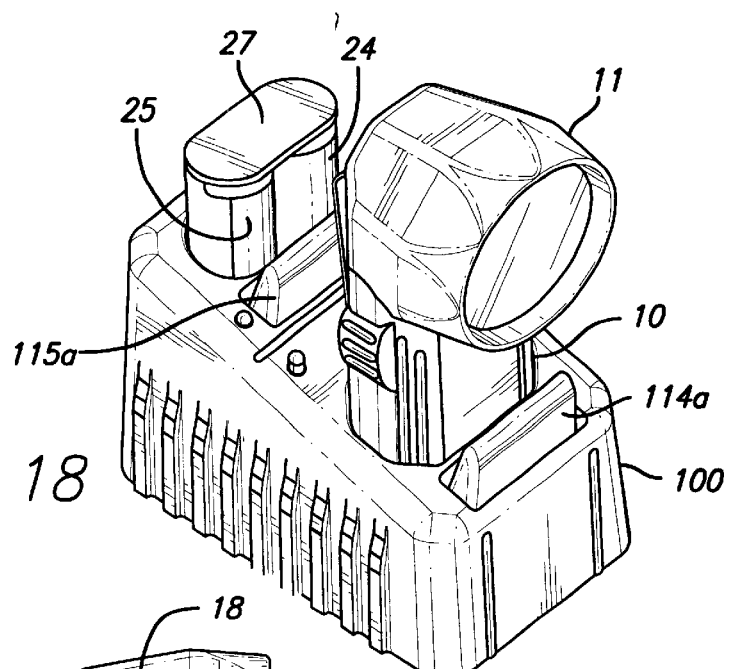
FIG. 18 is a front perspective view of a flashlight and a rechargeable battery pack in a recharger device.
Figure 19:
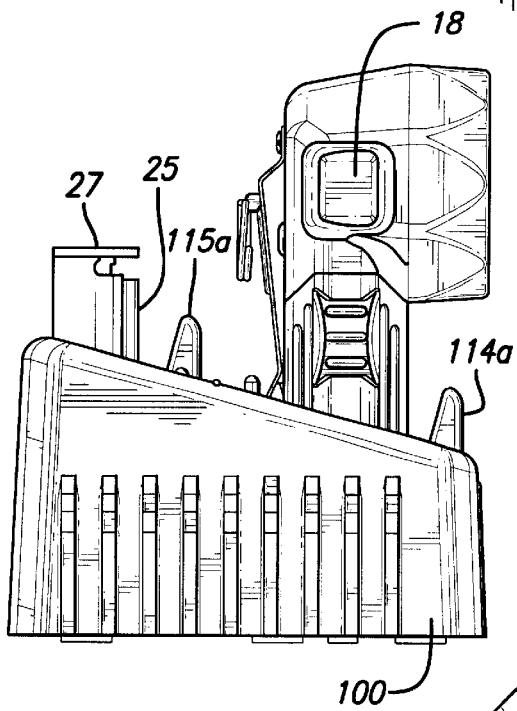
FIG. 19 is a side view of a recharger device with a flashlight in front and a rechargeable batter pack at the back.
Figure 33:
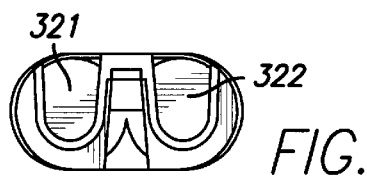
FIG. 33 is a top view of the rechargeable battery pack.

As shown in FIGS. 13, 33 and other figures there is a recharger assembly which includes a housing 100 which is a relatively trapezoidal shape when viewed from the side. There is a front top face 101 with a first slot 102 in the front and a rear slot 103 in the back. The slot 102 is for receiving, for example, a flashlight as illustrated. This flashlight would include the battery casing 10 which would fit in the slot 102. The rear slot 103 is for receiving a rechargeable battery pack 23 without the flashlight.

The recharger includes a base 104 which is substantially rectangular in configuration with slightly cutoff corners. The base 104 fits within the perimeter defined by the outside of the housing. Mounted on the base there are two wall-like structure 105 and 106 which in part define the perimeter of each of the respective slots 102 and 103. There is also a vertical wall configuration 107 which is located between the two slots and under which there are two longitudinal supporting members or bars 108 and 109. At the end of each of these horizontal bars 108 and 109 there is mounted a helical spring 110 for constituting the contact with the base of respectively the flashlight and rechargeable battery pack. There are indicator lights 111 which fit within the apertures 112 in the top face 101 of the housing.

On the front wall of the housing there is a label 113 to the charger. There are also two locking levers 114 and 115, respectively. Lever 114 is to operate as the locking lever for the first slot and lever 115 is to operate the locking lever for the second slot 103. This permits the flashlight to be locked and released from the slot 102 and the battery pack in slot 103 to be locked and released from that respective slot. Each of these respective levers 114 and 115 has a respective cap like element 114a and 115a respectively.

The locking levers 114 and 115 are respectively biased with spring members 310 and 311. Each of these spring members urge the respective locking members 114 and 115 into a position where the tip ends 303 and 304, respectively are urged towards the respective open slots 102 and 103. The tip ends 303 and 304 of the levers, respectively, are anchored with the slot 305 in the battery casing 10 of the flashlight, and the slot 306 in the case of the battery holder 300. Each of the slots 305 and 306, respectively, run transversely across the battery casing 10 and the battery holder 300. This causes the flashlight to be locked in position in a slot 102, and the battery holder to be locked in a position in the second slot 103 of the recharger. The operation of each with the levers 114 and 115 is effected by manual pressure on the caps 114a and 115a, respectively. The manual pressure is in the direction pushing the levers 114 and 115 towards the rear of the recharger. This levering action forces the ends 303 and 304 forwardly, respectively and the flashlight and the battery housing can be removed from the recharger. The respective weights of the flashlight and the rechargeable batteries respectively make contact with the spring contacts 110 in the base of the recharger. The springs 110 make contact with the feet 205 in the flashlight. The springs 301 and 302 in the battery housing 300 make contact with springs 110. When used in the recharger the battery housing 300 is turned upside down relative to its position in the battery casing 10.

As illustrated in FIGS. 24 through 29 and other figures, there are details of the bracket for holding the rechargeable battery pack. The extension bracket 22 is located above the battery pack 23. This bracket includes a pair of helical springs 200 mounted below the bracket 22 and which are for engagement with eyelets 201, which hold the springs relatively in position on the base of the bracket 22. Eyelets 202 likewise facilitate the location of the springs in position on the base of the extension bracket 22.

There is a latch 203 which operates with the boot 16 to release the battery pack. There are two charger contacts 204 which extend from the base of the bracket downward to the base of the charger 23, and each contact strip 204 ends in contact feet 255. Each one of these contacts 204 is operable with the respective batteries 24 and 25.

The top of the bracket is shown in FIG. 26 and the underneath of the bracket is illustrated in FIG. 29.

The battery pack 300 at the top 320 is to form slots 321 and 322 respectively. These slots are for receiving, respectively, the contact springs 200 at the base of the bracket 22. This permits the continuous contact to be made between the battery pack and the battery extension through the switch operable by switch button 18 to the bulb 14.

The battery pack 23 can be moved in and out of the battery casing by operating the latch 323 which fits into the aperture 17. In actuator 16 fits around the stem 324 which protrudes from the aperture 17 and is covered by the boot actuator 16. The top face 325 with a rail 326 defines the slot 327 which rides in a slot 328 in the bracket extension 22.

Figure 30:
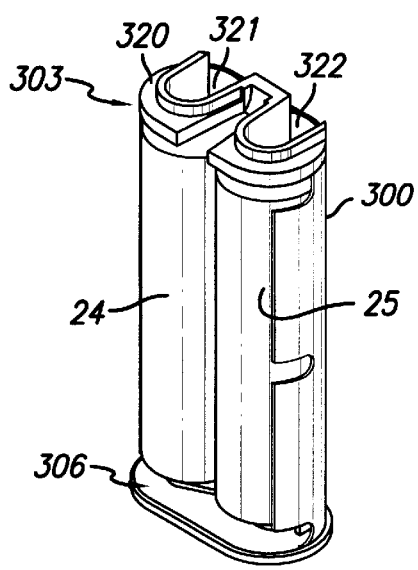
FIG. 30 is a perspective view of the rechargeable battery pack.
Figure 31:
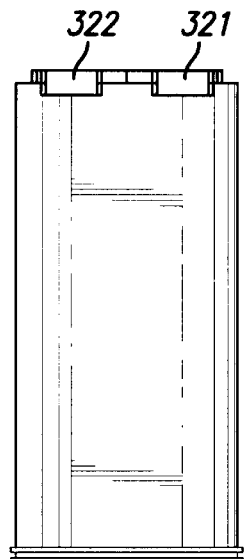
FIG. 31 is a front view of the rechargeable battery pack.
Figure 32:
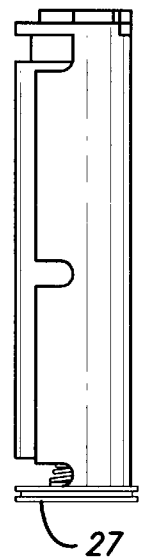
FIG. 32 is a side view of the rechargeable battery pack.
Figure 35:
FIG. 35 is a bottom view of the rechargeable battery pack.
Figure 34:
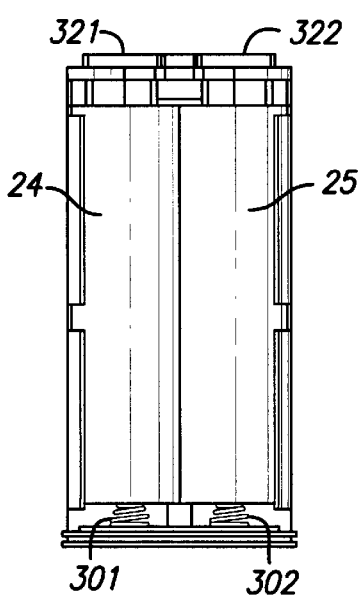
FIG. 34 is a front view of the rechargeable battery pack.
Figure 36:
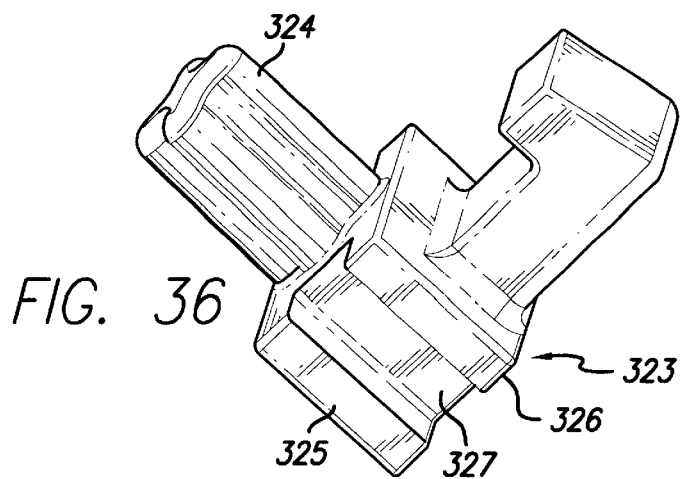
FIG. 36 is a perspective view of the latch for use with the battery extension assembly in the battery casing.

Each of the batteries 24 and 25 is contained in a battery housing 300 as shown in FIG. 30 and other figures. The base of the battery housing mounts, respectively, a spring 301 and 302 with the respective batteries 24 and 25. The buttons are located between the springs 301 and 302 and the top 303 of the housing 300. The base of the contacts 204, respectively, have feet 205. Each of the feet protrude from the base or tail of the battery casing 10 and the ends are upturned so that the feet 205 essentially grip the wall of the battery casing 10. The feet 205 make contact with the respective contact springs 110 in the front slot 102 of the recharger. The top of each of the batteries 24 and 25 makes contact with the springs 200 at the top of the battery housing 300 for the batteries. In this manner the battery pack 300 is located with the extendable member 22 in a conductive manner and can be suitably located in the flashlight casing.

Many other forms of the invention exist, each differing from others in matters of detail only.

Figure 20:
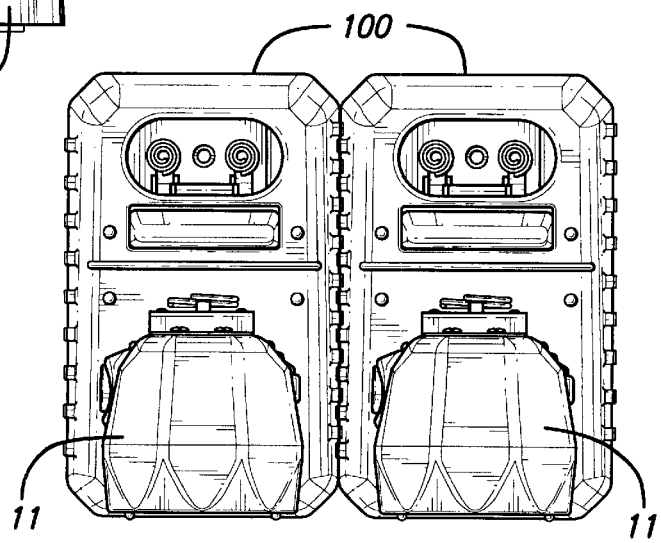
FIG. 20 is a top view of two recharges in an adjacent relationship with flashlight in the front slot of each of the recharging devices.
Figure 21:
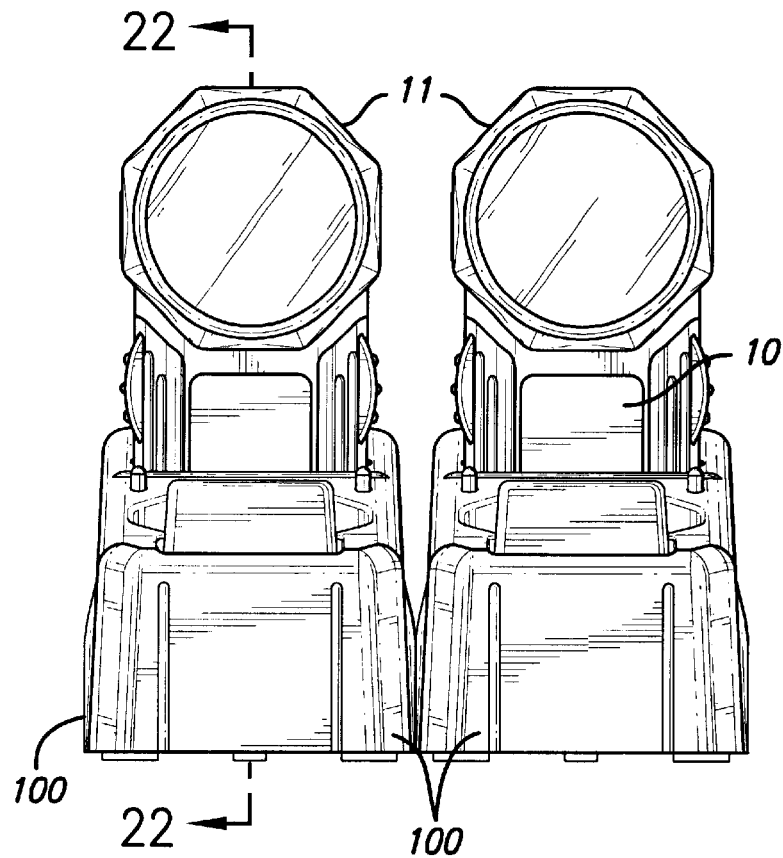
FIG. 21 is a front view of two recharges with flashlight in position.
Figure 22:
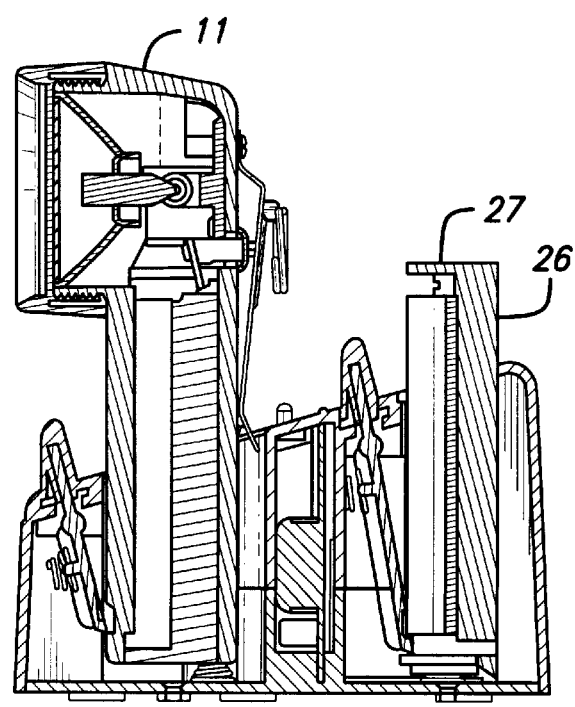
FIG. 22 is a side view of a recharger with a flashlight in the front slot and a rechargeable battery in the second slot.
Figure 23:
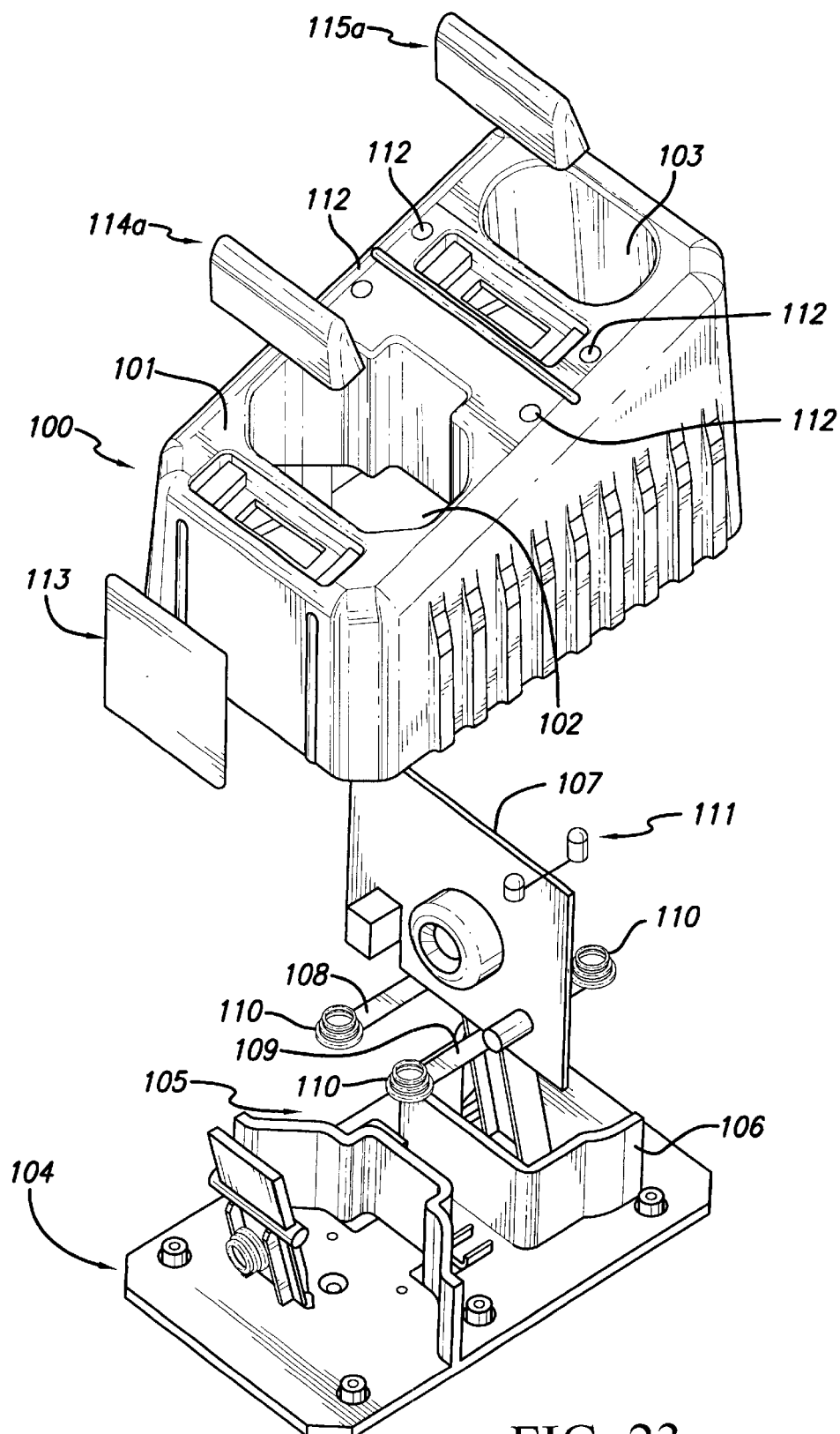
FIG. 23 is a view of a recharger in accordance with the invention.

In some forms of the invention instead of a right angular flashlight there could be a conventional straight line flashlight for use in the recharger. In other forms of the invention there could be other devices, for instance, vacuum units, pumps and motor devices which are rechargeable and not flashlights which can be used in the system. The recharger can be used for a flashlight and a rechargeable device, or for two flashlights if the two slots are suitably profiled. The system can use multiple rechargers and the ribbed side walls of the housing of each of the rechargers can be constructed so that they can accommodated next to each other in a useful manner. This is illustrated in FIG. 20.

The invention is to be determined solely in terms of the claims set out below.

What is claimed is:

1. A recharger device for a battery comprises:
    a base;
    a first slot for a first device requiring recharging;
    a second slot in adjacent relationship to the first slot, the second slot being for receiving a second device for recharging;
    contacts in the slots for contacting each of the respective devices;
    electrical means connected with the contacts to permit a recharging current to flow through the contacts when the electrical means is connected with an external power supply; and
    a locking member in at least one of the slots for locking a respective device in the slot when the device is located in the slot, the locking member being movable to permit release of the device, and the device having an aperture for receiving the locking member.

2. A recharger as claimed in claim 1 wherein both slots have respective locking members, and the device for each slot has an aperture for receiving the respective locking member in each slot.

3. A recharger as claimed in claim 1 wherein the first device is for receiving a flashlight housing and the second slot is for receiving a rechargeable battery pack.

4. A recharger as claimed in claim 1 wherein the contacts are located adjacent to the base and wherein the weight of the devices effects contact between the contacts and the device for recharging.

5. A recharger as claimed in claim 1 wherein the slots are located in a top face of a recharger device and wherein the recharger device essentially defines a trapezoidal shape in a sideways cross-section such that the first slot is located in the front of the top face at a lower elevation than a second slot located in the rear of the top face.

6. A recharger as claimed in claim 1 wherein the aperture for receiving the locking member is a slot.

7. A recharger device for a battery comprises:
    a base;
    a first slot for a first device requiring recharging;
    a second slot in adjacent relationship to the first slot, the second slot being for receiving a second device for recharging;
    contacts in the slots for contacting each of the respective devices;
    electrical means connected with the contacts to permit a recharging current to flow through the contacts when the electrical means is connected with an external power supply;
    a locking member in at least one of the slots for locking a respective device in the slot when the device is located in the slot, the locking member being movable to permit release of the device, wherein the locking member includes a lever spring-mounted and biased in the locking position such that entry of the device into the slot acts to push the lever against the locking position and when the device is correctly located in the slot, the spring pushes the lever towards the devices and thereby locks the device in position; and
    a handle on the lever to permit urging the lever against the spring action and thereby release the device from its locked position in the slot.

8. A recharger as claimed in claim 7 wherein both slots have respective locking members.

9. A recharger as claimed in claim 7 wherein the first device is for receiving a flashlight housing and the second slot is for receiving a rechargeable battery pack.

10. A recharger as claimed in claim 7 wherein the contacts are located adjacent to the base and wherein the weight of the devices effects contact between the contacts and the device for recharging.

11. A recharger as claimed in claim 7 wherein the slots are located in a top face of a recharger device and wherein the recharger device essentially defines a trapezoidal shape in a sideways cross-section such that the first slot is located in the front of the top face at a lower elevation than a second slot located in the rear of the top face.

12. A recharger device for a battery comprises:
    a base;
    a first slot for a first device requiring recharging;
    a second slot in adjacent relationship to the first slot, the second slot being for receiving a second device for recharging;
    contacts in the slots for contacting each of the respective devices;
    electrical means connected with the contacts to permit a recharging current to flow through the contacts when the electrical means is connected with an external power supply; and;
    a handle in front of each slot for acting to release the respective device from a locked position in the respective slot.

13. A recharger as claimed in claim 12 including a locking member in the slots for locking a respective device in the slot when the device is located in the slot, the locking member being movable under action of the handle to permit release of the device.

14. A recharger device for a battery comprises:
    a base;
    a first slot for a first device requiring recharging;
    a second slot in adjacent relationship to the first slot, the second slot being for receiving a second device for recharging;

contacts in the slots for contacting each of the respective devices;

electrical means connected with the contacts to permit a recharging current to flow through the contacts when the electrical means is connected with an external power supply;

the locking member including a lever spring-mounted and biased in the locking position such that entry of the device into the slot acts to push the lever towards the device, and a lever for facilitating unlocking and releasing of the device.

15. A recharger as claimed in claim 16 wherein both slots have respective locking members.

16. A recharger as claimed in claim 14 wherein the first device is for receiving a flashlight housing and the second slot is for receiving a rechargeable battery pack.

17. A recharger as claimed in claim 14 including a handle on the lever to permit urging the lever against the spring action and thereby release the device from its locked position in the slot.

18. A recharger as claimed in claim 14 wherein the contacts are located adjacent to the base and wherein the weight of the devices effects contact between the contacts and the device for recharging.

19. A recharger as claimed in claim 14 wherein the slots are located in a top face of a recharger device and wherein the recharger device essentially defines a trapezoidal shape in a sideways cross-section such that the first slot is located in the front of the top face at a lower elevation than a second slot located in the rear of the top face.

* * * * *